(12) United States Patent
Venturi (10) Patent No.: US 8,511,410 B2
(45) Date of Patent: Aug. 20, 2013

(54) TRAVEL SYSTEM FOR A HYBRID TYPE MOTOR VEHICLE AND METHOD FOR DRIVING SAME

(75) Inventor: Stéphane Venturi, Roiffieux (FR)

(73) Assignee: IFP, Rueil Malmaison Cedex (FR)

( * ) Notice: Subject to any disclaimer, the term of this patent is extended or adjusted under 35 U.S.C. 154(b) by 234 days.

(21) Appl. No.: 12/833,033

(22) Filed: Jul. 9, 2010

(65) Prior Publication Data
US 2011/0011655 A1   Jan. 20, 2011

(30) Foreign Application Priority Data
Jul. 15, 2009 (FR) ...................................... 09 03474

(51) Int. Cl.
*B60K 6/36* (2007.10)
(52) U.S. Cl.
USPC ........................... 180/65.6; 180/65.22; 477/5
(58) Field of Classification Search
USPC .................. 180/65.22, 65.25, 65.6; 477/2, 3, 477/5, 6
See application file for complete search history.

(56) References Cited

U.S. PATENT DOCUMENTS

| 6,258,006 B1 * | 7/2001 | Hanyu et al. ...................... 477/5 |
| 6,502,474 B2 * | 1/2003 | Sakamoto et al. ............... 74/325 |
| 7,238,139 B2 * | 7/2007 | Roethler et al. .............. 475/216 |

FOREIGN PATENT DOCUMENTS
FR            2 670 440         10/1990

* cited by examiner

*Primary Examiner* — John Walters
(74) *Attorney, Agent, or Firm* — Antonelli, Terry, Stout & Kraus, LLP.

(57) ABSTRACT

The present invention relates to a travel system for a hybrid type motor vehicle comprising a thermal engine (10) with a shaft (12), an electric machine (14) with a rotor (16) connected to electric accumulators (72), a drive shaft (16) controlled in rotation by the machine and/or the engine for rotating the motive axle (60) of the vehicle, and a rotating speed variation device (13) between said drive shaft and shaft (12) of engine (10). According to the invention, the speed variation device comprises at least two alternate paths (VT1, VT2) for motion transmission to motive axle (60) controlled each by a disengageable coupling (30, 36).

20 Claims, 7 Drawing Sheets

TRAVEL SYSTEM FOR A HYBRID TYPE MOTOR VEHICLE AND METHOD FOR DRIVING SAME

BACKGROUND OF THE INVENTION

1. Field of the Invention

The present invention relates to a travel system for a hybrid type motor vehicle.

2. Description of the Prior Art

Hybrid type motor vehicles combine, as a traction or propulsion drive means, a thermal engine which is generally an internal-combustion engine, and a rotary electric machine connected to an electric source, such as one or more electric accumulators. This combination allows the performance of the vehicle to be optimized, notably by limiting the discharge of pollutants to the atmosphere and by decreasing the fuel consumption of the entire device.

As it is already known, notably from French Patent Application No. 2,670,440, hybrid vehicles comprise a drive system with a thermal engine including an output shaft connected to a speed variation device and an electric machine connected to an electric battery. This system also comprises two clutches with a first clutch between the thermal engine and the electric machine and a second clutch between the electric machine and the speed variation device.

Thus, when the vehicle is to be driven with a high torque available over a wide speed range while limiting exhaust gas and noise generation, as in an urban site, the electric machine is preferably used for driving the motive axle of the vehicle.

On the other hand, for uses where a high driving power and a wide operating range are required, the thermal engine is used for driving the motive axle and thus providing powering of the vehicle.

Although satisfactory, this drive system however involves some significant drawbacks.

In fact, when the electric machine is used to drive the vehicle, sufficient torque is required therefrom for driving the vehicle as well as overcoming all the resistances (inertia, friction, . . . ) inherent in the vehicle and in the speed variation device.

Furthermore, during vehicle braking, part of the energy released thereby is absorbed by the speed variation device and only a minor part of this energy is recovered which is then converted to electric power by the electric machine.

SUMMARY OF THE INVENTION

The present invention overcomes the aforementioned drawbacks with a simple drive system with devices constantly providing transfer to the motive axle and vice versa.

The invention therefore relates to a travel system for a hybrid type motor vehicle comprising a thermal engine with a shaft, an electric machine with a rotor connected to electric accumulators, a drive shaft controlled in rotation by the machine and/or the engine for rotating the motive axle of the vehicle, and a rotating speed variation device between the drive shaft and the engine shaft, which the speed variation device comprises at least two alternate paths for motion transmission to the motive axle which are each controlled by at least one disengageable coupling.

One of the transmission paths can comprise the engine shaft and a disengageable coupling for connection in rotation with the drive shaft.

The other transmission path can comprise the engine shaft, an engine shaft rotating speed reduction device and another disengageable coupling for connection in rotation between the device and the drive shaft.

The rotating speed reduction device can comprise a speed-reducer motion transmission device between the shaft and at least one of the camshafts, and another speed-reducer motion transmission device between this camshaft and the disengageable coupling.

The rotating speed reduction device can comprise a speed-reducer motion transmission device between the shaft and a rotary axle carried by a fixed part of the vehicle, and another speed-reducer motion transmission device between this axle and the disengageable coupling.

The other speed-reducer motion transmission device can comprise a disengageable coupling providing rotating motion transmission between the rotary axle and the disengageable coupling.

The other speed-reducer motion transmission device can comprise a disengageable coupling providing rotating motion transmission between the rotor of the electric machine and the disengageable coupling.

The rotating speed reduction device can comprise an epicyclic train whose inner planetary gear is carried by the engine shaft, the outer planetary gear is carried by a fixed part of the vehicle and the satellites are carried by the disengageable coupling.

The drive shaft can carry a disengageable coupling for transmission of its rotating motion to the motive axle.

The drive shaft can carry an actuator for operating one or the other of the couplings.

The drive shaft can comprise the rotor of the electric machine or a shaft independent of the engine and/or of the electric machine.

The drive shaft can be connected to the motive axle by a motion transmission device.

The invention also relates to a method of travel of a hybrid type motor vehicle comprising a thermal engine with a shaft, an electric machine with a rotor connected to electric accumulators, a drive shaft controlled by the machine and/or the engine for rotating the motive axle of the vehicle, and a speed variation device between said drive shaft and the engine shaft, wherein the engine shaft is connected to the motive axle drive shaft by at least two alternate paths for rotary motion transmission which are each controlled by at least one disengageable coupling.

The method can provide one of the rotary motion transmission paths with a device for reducing the rotating speed of the shaft so as to obtain a drive shaft rotation with a different rotating speed from that of the other path.

The method can start the thermal engine by supplying the electric machine from the accumulators and connect the rotor of the machine to the engine shaft through one of the motion transmission paths.

In order to achieve recharging of the accumulators, the method can consist in connecting the engine shaft to the rotor of the electric machine with one of the motion transmission paths.

During braking phases of the vehicle, the method can recover the mechanical energy of the motive axle so as to transmit it to the engine shaft by connecting the drive shaft to the shaft with one of the motion transmission paths.

BRIEF DESCRIPTION OF THE FIGURES

Other features and advantages of the invention will be clear from reading the description hereafter, given by way of non limitative example, with reference to the accompanying figures wherein.

DETAILED DESCRIPTION OF THE INVENTION

Figure 1:
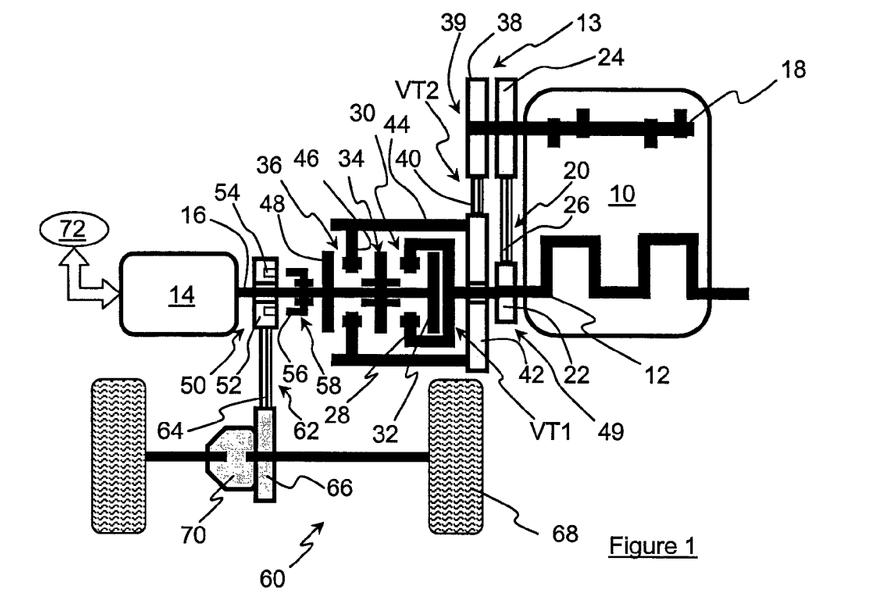
FIG. 1 is a diagram showing a drive system for a hybrid vehicle according to the invention.

As illustrated in FIG. 1, the system for driving a hybrid vehicle comprises a thermal engine 10, notably an internal-combustion engine, with an engine shaft 12, here the crankshaft of this engine, controlling a speed variation device 13. This system also comprises an electric machine 14 with a rotor 16 that can work as an electric motor or as an electric power generator (or alternator).

As it is well known, shaft 12 of the thermal engine drives in rotation at least one camshaft 18, two camshafts here, which control the exhaust and intake valves (not shown) of this engine by means of a speed-reducer rotating motion transmission device 20. Usually, this device comprises a driving wheel 22 fixedly mounted on engine shaft 12, a receiving wheel 24 of larger diameter than the driving wheel fixedly mounted on each camshaft and a transmission belt 26 (or a transmission chain or a gear train) connecting these two wheels in rotation.

As better illustrated in this figure, the end of engine shaft 12 carries, fixed in rotation but mobile in axial translation, an element 28 of a disengageable friction coupling 30 between this shaft 12 and rotor 16 of machine 14. This element, forming the reaction plate of this coupling, is arranged opposite another plate 32 that makes up the pressure plate fixed in rotation an in translation with rotor 16. These two plates are to be contacted with each other so as to be secured in rotation under the action of an actuator 34 carried by rotor 16 while being free in translation on this rotor.

Thus, when this coupling 30 is effective, the rotor is in direct gear with the engine shaft with a rotating motion transmission path VT1, which is referred to as the long path, corresponding to a speed equal to that of the engine crankshaft.

Another disengageable friction coupling 36 is provided to ensure alternately transmission of the rotating motion from shaft 12 of the thermal engine, via camshafts 28, to rotor 16. The camshafts therefore fixedly carry a driving pulley 38 arranged opposite wheel 24 and belonging to another speed-reducer rotating motion transmission device 39. This pulley is connected by a transmission belt (or a transmission chain or a gear train) to a receiving pulley 42 (of larger diameter than the driving pulley) mounted free in rotation on engine shaft 12 while being axially fixed thereon. This pulley, arranged opposite driving wheel 22, is connected to a housing 44 surrounding coupling 30 between the rotor and the engine shaft. This housing carries an axially mobile reaction plate 46 facing actuator 34 and it is intended to ensure connection in rotation with another fixed pressure plate 48 carried by rotor 16, under the action of actuator 34, thus forming the other disengageable friction coupling 36.

When this other coupling is operational, rotor 16 is connected in rotation to shaft 12 of the thermal engine with a rotating motion transmission path VT2, which is referred to as the short path, which corresponds to the reduction in the rotating speed of this shaft 12 by speed reduction device 49. This reduction device thus comprises speed reducer device 39 and speed reducer device 20.

The rotor of the electric machine can thus be driven in rotation by the thermal engine by two alternate transmission paths VT1 or VT2, through engaging of one or the other of couplings 30 or 36.

Rotor 16 can therefore be driven in rotation at different speeds, either at high speed by shaft 12 or at low speed by a reduction in the rotating speed of shaft 12 through speed reduction device 49.

As can be better seen in this figure, rotor 16 carries another disengageable coupling 50, a mesh coupling here, comprising a plate 2 fixed in translation while being mounted free in rotation on the rotor. This plate comprises recesses 54 for cooperation with fingers 56 of an actuator 58 mounted fixedly in rotation on the rotor but freely in translation thereon.

In order to provide rotating motion transmission between this rotor and a motive axle 60, a motion transmission device 62 is arranged between this rotor and this axle. Preferably, a transmission belt 64 is arranged between plate 52 and a fixed pulley 66 placed on this axle. This pulley thus allows driving wheels 68 of the vehicle a transmission, such as a differential 70.

Of course, electric machine 14 is connected to electric accumulators 72 while being controlled by a control device (not shown) for feeding the engine and/or charging these accumulators.

Similarly, actuators 34 and 58 are controlled by any control means (not shown), such as jacks, allowing their displacement on rotor 16 for the desired engaging of couplings 30, 36, 50, under the effect of a control unit such as the powertrain calculator (not shown) any vehicle is equipped with.

Thus, speed variation device 13 comprises a first speed stage made up of path VT1 and a second speed stage, shorter than the long path VT2.

The various configurations of the drive system hereinafter described according to the traction mode used and/or to the operation of the thermal engine and of the electric machine.

For simplification reasons, in the description below, coupling 30 between shaft 12 and rotor 16 is referred to as the "high-speed coupling", the other friction coupling 36 is referred to as the "low-speed coupling" and mesh coupling 50 is referred to as the "jaw coupling".

Figure 2:
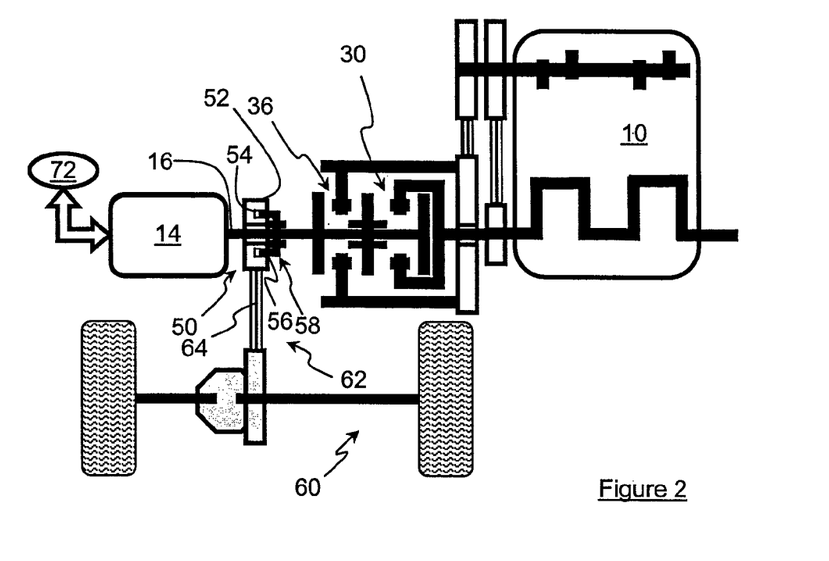
FIG. 2 shows the system of FIG. 1 in a first operating configuration.

The configuration of FIG. 2 illustrates the electric mode wherein only electric machine 14 is used, notably as the motive machine for the engine.

Neither of the two couplings, namely the high-speed 30 or the low-speed 36, is thus engaged whereas jaw coupling 50 is in gear through the displacement of actuator 58 allowing engagement of fingers 56 into recesses 54 of plate 52. Therefore, as soon as electric machine 14 is fed by accumulators 72, rotor 16 is driven in rotation and transmits its rotary motion to actuator 58 that is connected in rotation to plate 52. This rotation is then transmitted to motive axle 60 by belt 64 of motion transmission device 62.

This configuration allows the vehicle to run in forward or reverse gear while leaving the possibility for engine 10 remaining in operation, notably for driving vehicle auxiliaries (power steering pump, air conditioning compressor, etc.).

Figure 3:
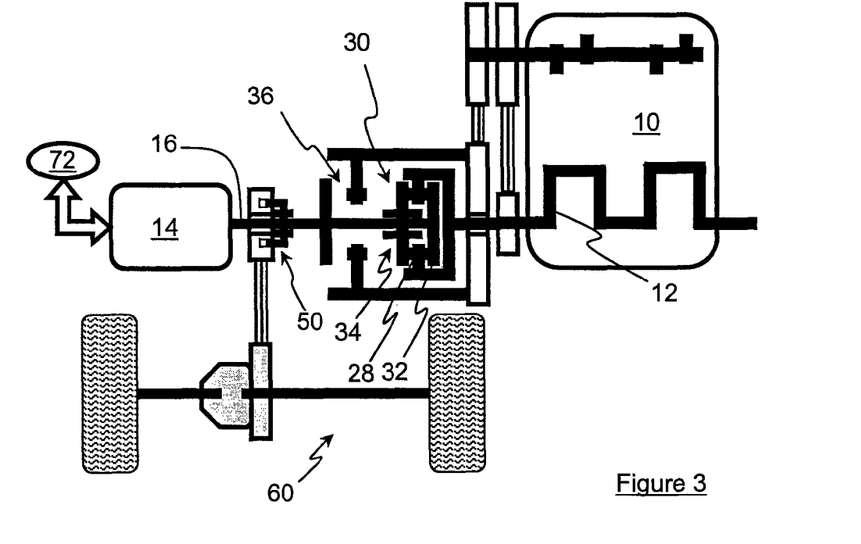
FIG. 3 shows the system of FIG. 1 in a second operating configuration.

In another configuration illustrated in FIG. 3, jaw coupling 50 is in gear, as described above, and thus transmits the rotating motion of rotor 16 to motive axle 60 as soon as electric machine 14 is fed by accumulators 72. This machine 14 is thus used as a motive machine for the motor vehicle.

Once rotation of rotor 16 obtained, high-speed coupling 30 is engaged through displacement of actuator 34 to the right (considering FIG. 1). This allows connection of rotation rotor 16 to shaft 12 of the thermal engine through the link between reaction and pressure plates 28 and 32. In this case, it is possible to start the engine by driving in rotation shaft 12 under the action of rotor 16 and under the control of the controller.

As soon as engine starting is achieved, actuator 34 is controlled to the left so as to make the high-speed coupling inoperative, without engaging low-speed coupling 36. The engine thus remains in operation, notably to drive its auxiliaries, as mentioned above.

Electric machine 14 therefore has a double function, traction of the vehicle and starting of the thermal engine while the vehicle is moving, and without disturbing the operation of this electric machine used for driving the vehicle.

Figure 4:
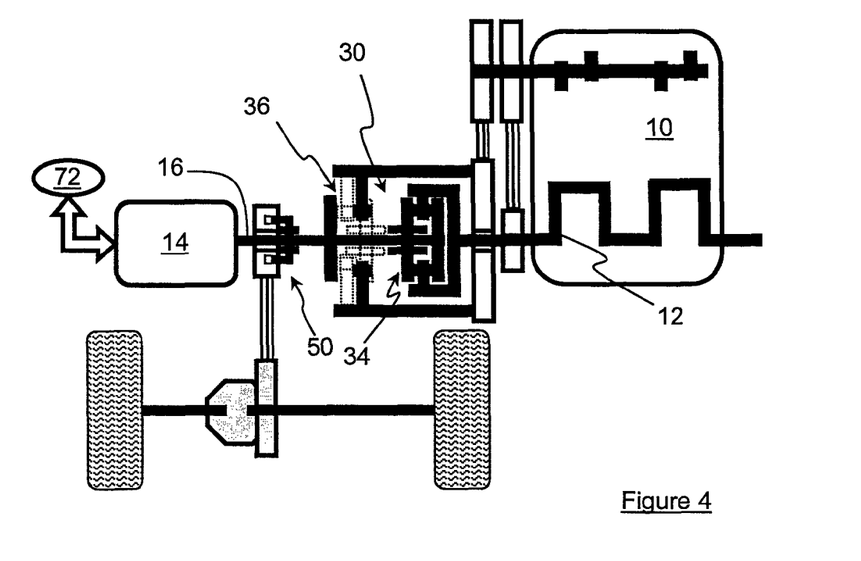
FIG. 4 shows the system of FIG. 1 in a third operating configuration.

In the configuration of FIG. 4, traction of the vehicle is provided both by electric machine 14 and by thermal engine 10.

In this case, jaw coupling 50 is engaged, as described above in connection with FIG. 2. Electric machine 14 is thus used as the motive machine for the motor vehicle and its power is used to perform this traction.

Simultaneously, one of the high-speed 30 or low-speed 36 couplings (in thick line or dotted line) is engaged by actuator 34, thus connecting shaft 12 to rotor 16. As a result of this connection, the power generated by this engine is transmitted by shaft 12 to rotor 16, thus coming on top of that transmitted by electric machine 14.

It is considered in this configuration that the engine has already been started, either as described in connection with FIG. 3 or as described in connection with FIG. 5 hereafter.

Figure 5:
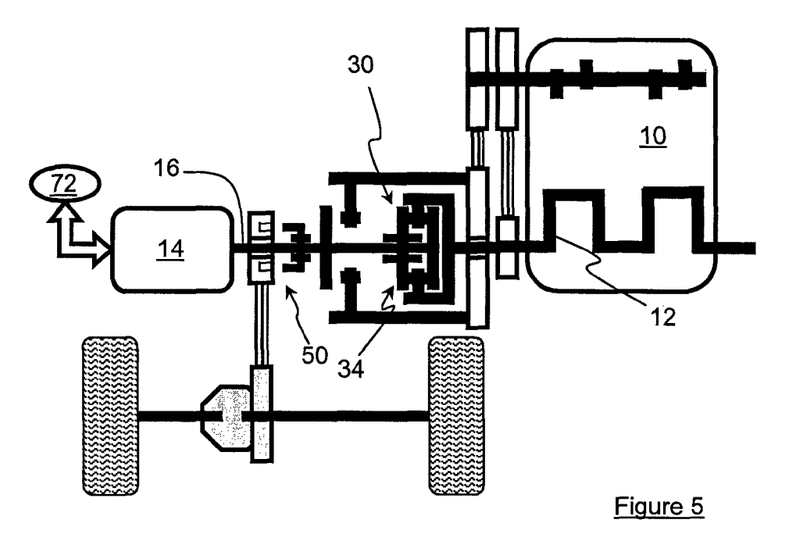
FIG. 5 shows the system of FIG. 1 in a fourth operating configuration.

In the layout of FIG. 5, electric machine 14 is used for starting engine 10.

Jaw coupling 50 is therefore not operational and high-speed coupling 30 is engaged under the action of actuator 34.

As soon as electric machine is supplied by accumulators 72, its rotor 16 is driven in rotation. Considering the link, through coupling 30, between this rotor and shaft 12, the latter is driven in rotation by the rotor. The engine is thus started under the control of the controller.

Of course, as soon as engine start is achieved, the high-speed coupling is made inoperative under the action of actuator 34 and the engine remains in operation.

Other operating modes of the thermal engine and of the electric machine are described hereinafter in connection with the figures already described.

For driving the vehicle only with thermal engine 10, the configuration used is that of FIG. 4, with engaging of jaw coupling 50 and of one of the friction couplings 30 or 36.

This allows establishing a high or low-speed rotation link between shaft 12 and rotor 16. The vehicle is thus driven by the thermal engine according to two different speeds. Rotation of rotor 16 can be used to convert electric machine 14 to a current generator (or alternator) notably for recharging accumulators 72.

In another operating mode with a configuration corresponding to FIG. 5, thermal engine 10 is already running and is used only for recharging the accumulators.

The link in rotation between rotor 16 and shaft 12 is provided by actuating one of friction couplings 30, 36 and the jaw coupling is disengaged.

Rotor 16 of machine 14 is driven in rotation by shaft 12 and this machine is thus used as a current generator for recharging the accumulators and/or supplying vehicle accessories.

As regards brake energy recovery, the configuration used corresponds to that of FIG. 2 where only jaw coupling 50 is engaged.

During braking, the energy to be recovered comes from motive axle 60 that drives in rotation rotor 16 via transmission device 62. This rotation is thus used for converting electric machine 14 to a current generator for recharging the accumulators and/or supplying the vehicle accessories.

According to the configuration illustrated in FIG. 3, it is possible both to recover brake energy for electric machine 14, as described above, and to achieve engine braking through thermal engine 10.

High-speed coupling 30 is operational, as well as jaw coupling 50. The energy coming from axle 60 is thus transmitted to rotor 16 by motion transmission device 62 by driving this rotor in rotation, as mentioned above. Considering the link in rotation between the rotor and engine shaft 10, the engine shaft transmits a negative torque and slows down the rotor rotation. This slowing down is then transmitted to the motive axle by transmission device 62.

Of course, only engine braking can be used by deactivating the controller of the electric machine. This allows letting the rotor to rotate freely without any effect on the accumulators 72.

Thus, in the case of the example described in connection with FIGS. 1 to 5, rotor 16 is used as a drive shaft, either for motive axle 60 or for thermal engine 10 (starting, engine braking, etc.), and/or for the electric machine 14 (accumulators recharging, etc.).

Figure 6:
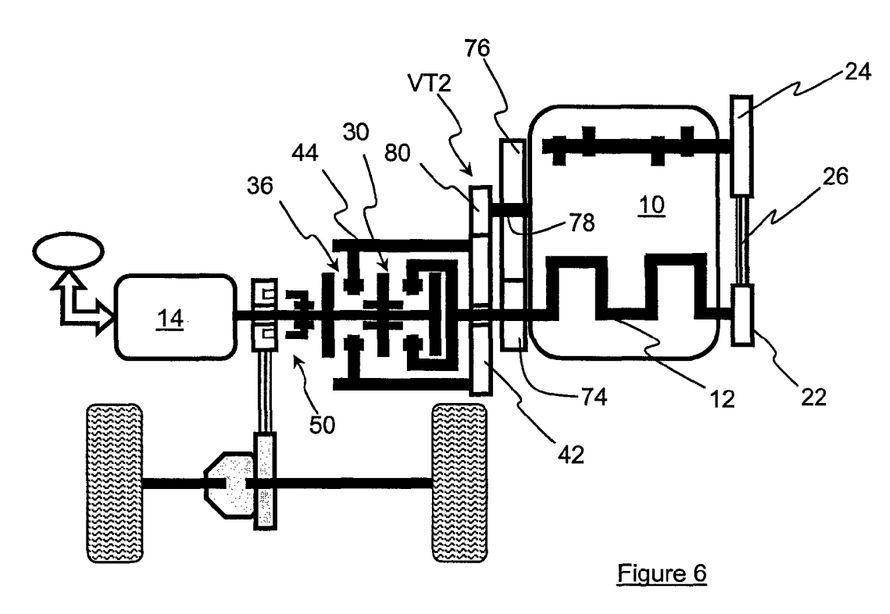
FIG. 6 illustrates a first variant of the drive system of FIG. 1.

FIG. 6 illustrates a variant of the invention and it therefore comprises the same reference numbers for the elements common to FIG. 1.

This variant differs from FIG. 1 in the layout of shorter transmission path VT2.

The transmission path VT2 comprises a driving wheel 74, advantageously a gear wheel, mounted fixedly on shaft 12 of engine 10. Wheel 74 drives by engaging, a receiving gear wheel 76 of larger diameter than the driving wheel and mounted fixedly on a receiving axle 78 rotating freely on a fixed part of the vehicle such as the engine. Driving wheel 74 associated with receiving wheel 76 thus form a speed-reducer rotating motion transmission device. This axle carries fixedly a transmission pulley 80 that drives in rotation receiving pulley 42 carrying housing 44 with the this receiving pulley having a larger diameter than pulley 80. Advantageously, transmission pulley 80 and receiving pulley 42 are gear wheels that engage onto one another, thus forming another speed-reducer rotating motion transmission device.

Advantageously, the device controlling camshafts 18 that control the exhaust and intake valves is the same as the device described above in connection with FIG. 1, but it is arranged on the other side of the engine, as shown in FIG. 6. This device thus comprises driving wheel 22 fixedly mounted on engine shaft 12 with receiving wheel 42 fixedly mounted on the camshafts and transmission belt 26.

Figure 7:
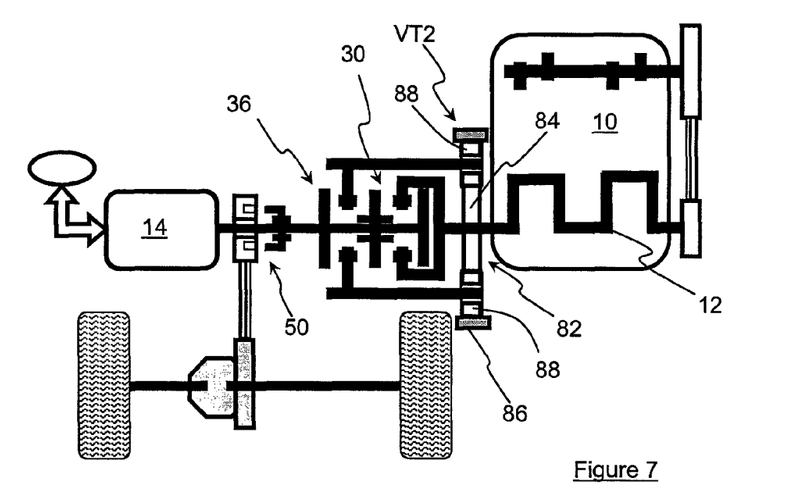
FIG. 7 shows a second variant of the drive system of FIG. 1.

FIG. 7 illustrates another variant of the invention for implementing the short transmission path VT2.

Transmission path VT2 comprises an epicyclic train 82, forming a speed-reducer rotating motion transmission device, with a rotary inner planetary gear 84 fixedly carried by shaft 12 of engine 10, a fixed outer planetary gear 86 carried by a fixed element of the engine or of the vehicle, and satellites 88 carried by housing 44 of coupling 36 and cooperating with the planetary gears.

The various configurations of the drive system according to the traction mode used and/or to the operation of the thermal engine and of the electric machine for the variants of FIGS. 6 and 7 are identical to those described in connection with FIGS. 1 to 5.

Figure 8:
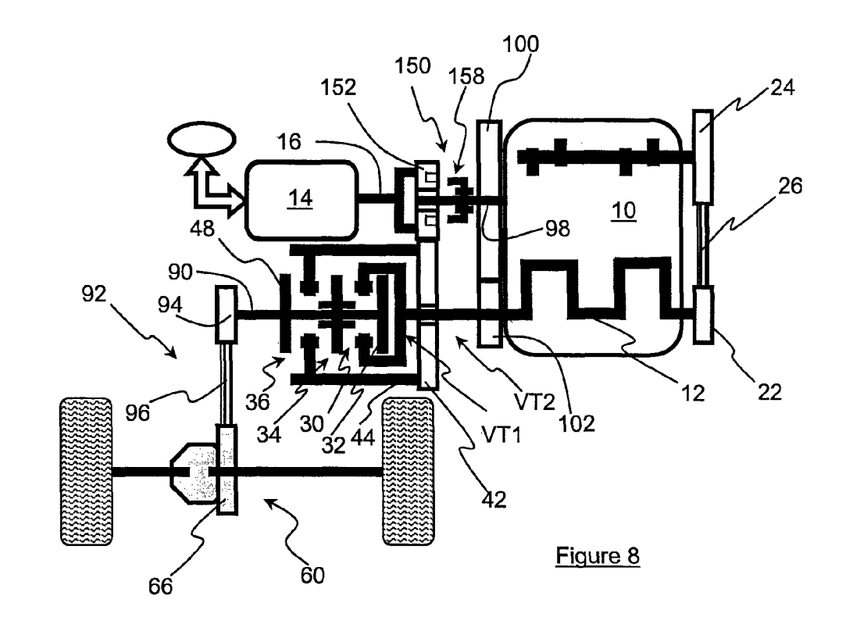
FIG. 8 shows another illustration of the drive system according to the invention.

In the variant of FIG. 8, pressure plates 32 and 48 of couplings 30 and 36, and of actuator 34, are carried by an independent rotary drive shaft 90 forming an extension of shaft 12 of engine 10. This independent shaft is connected by a motion transmission device 92 to motive axle 60. This device comprises a fixed pulley 94 arranged at the end of the independent shaft and a transmission belt 96 between this pulley and pulley 66 of motive axle 60.

Plate 152 of jaw coupling 150, identical to jaw coupling 50 described above, is fixedly linked to rotor 16 of electric machine 14. This plate cooperates in rotation, advantageously by engaging, with receiving pulley 42 carrying housing 44 for low-speed coupling 36. The electric machine with its rotor 16 is therefore arranged substantially parallel to independent shaft 90.

Actuator 158 of jaw coupling 150 is carried freely in translation but fixedly in rotation by a turning axle 98 supported by a fixed part of the engine such as the engine case. A receiving wheel 100 is arranged fixedly on this axle and it cooperates, preferably through engaging, with a driving wheel 102 carried fixedly by engine shaft 12.

Similar to FIG. 1, independent drive shaft 90 is in direct gear with shaft 12 of engine 10 with a transmission path VT1, referred to as the long path, corresponding to a speed equal to that of the engine crankshaft when high-speed coupling 30 is operational under the action of actuator 34.

Similarly, when low-speed coupling 36 is actuated and the jaw coupling engaged, independent shaft 90 is connected in rotation to engine shaft 12 with the short transmission path VT2. Short path VT2 comprises driving wheel 102, receiving wheel 100, plate 152 and receiving pulley 42 with speed reduction between shaft 12 and independent shaft 90.

Independent shaft 90 can therefore be driven in rotation at different speeds, either at high speed by shaft 12 with the long path VT1, or at low speed by means of the speed reduction from short transmission path VT2.

The various operating stages of this variant are substantially identical to those of FIGS. 1 to 5.

Thus, for the electric traction mode where electric machine 14 is supplied by accumulators 72 (FIG. 9), jaw coupling 150 is not engaged and low-speed coupling 36 is engaged. Thus, the rotation of rotor 16 is transmitted to pulley 42 by plate 152, then to independent shaft 90 by the slow-speed coupling 36. This rotation is then retransmitted to motive axle 60 by transmission device 92.

Figure 9:
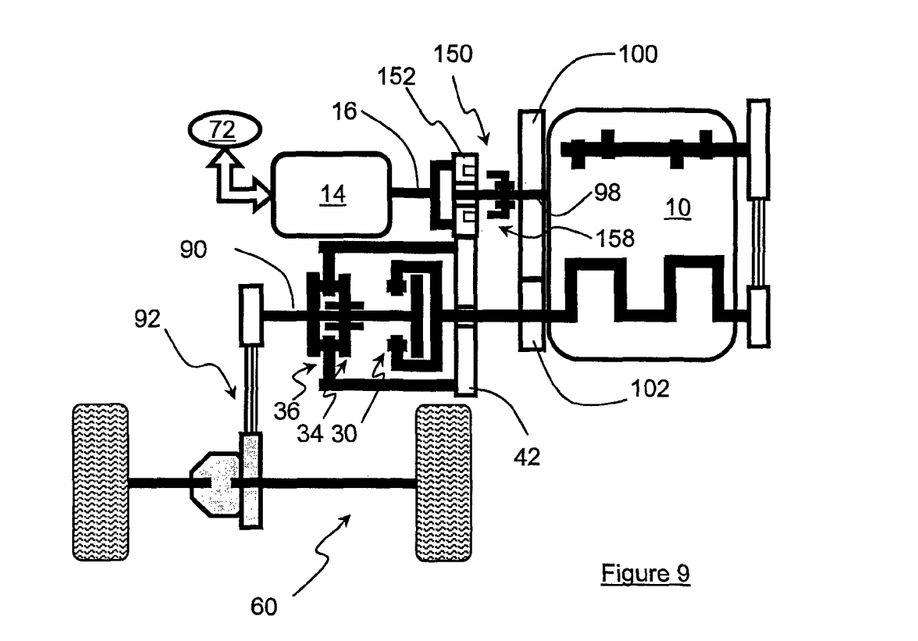
FIGS. 9 to 12 show the various operating configurations of the drive system of FIG. 8.

The vehicle thus operates under traction conditions of electric origin, in forward or reverse gear, while leaving the possibility for engine 10 remaining in operation, notably for driving vehicle auxiliaries (power steering pump, air conditioning compressor, etc.).

Figure 10:
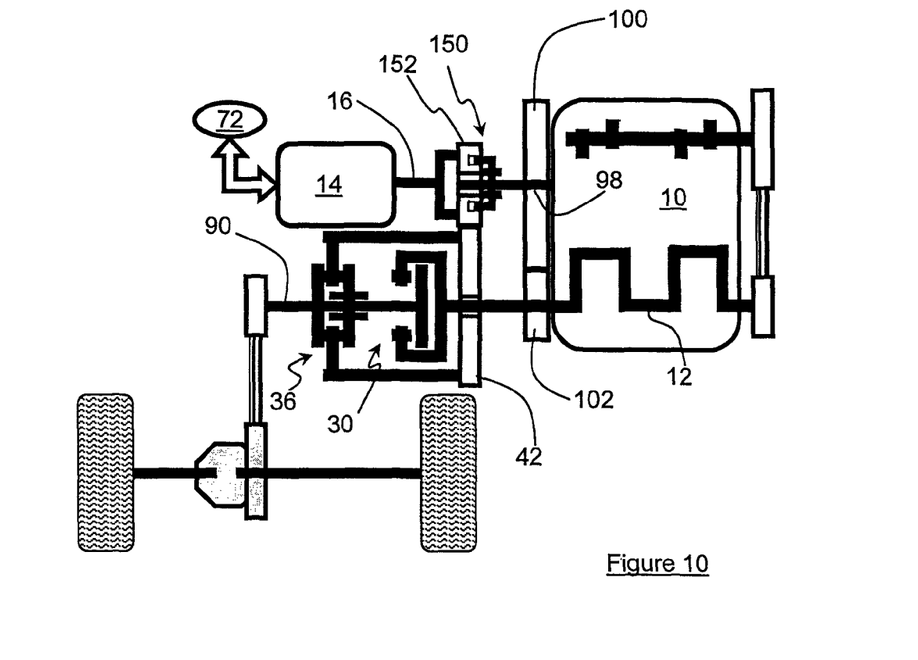

In order to associate this electric traction mode with the optional engine starting (when it is not running), jaw coupling 150 is engaged and rotor 16 is connected in rotation to axle 98. The rotation of this axle causes rotation of receiving wheel 100, which in turn rotates wheel 102. The rotation of this wheel, linked to shaft 12, thus allows the engine to be started (FIG. 10).

Of course, once the engine started, the jaw coupling is disengaged and the engine keeps running so as to drive notably its auxiliaries.

Figure 11:
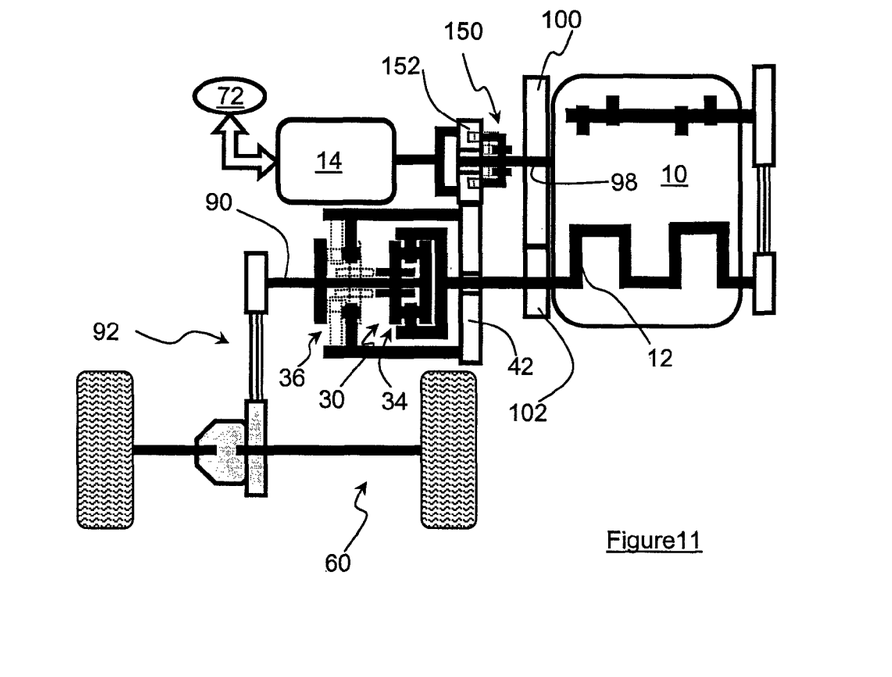

For the example of FIG. 11, traction of the vehicle is provided by engine 10 only, at high or low speed.

For high-speed driving, only coupling 30 is operational under the action of actuator 34. The rotation of shaft 12 is transmitted by coupling 30 directly to independent shaft 90 that drives motive axle 60 through device 92.

For low speed, jaw coupling 150 is engaged while securing plate 152 to axle 98, and low-speed coupling 36 is controlled by actuator 34 (as shown in dotted line in the figure). The rotation of shaft 12 is transmitted to independent shaft 90 by driving wheel 102, receiving wheel 100, plate 152, pulley 42 and coupling 36 while being geared down.

Figure 12:
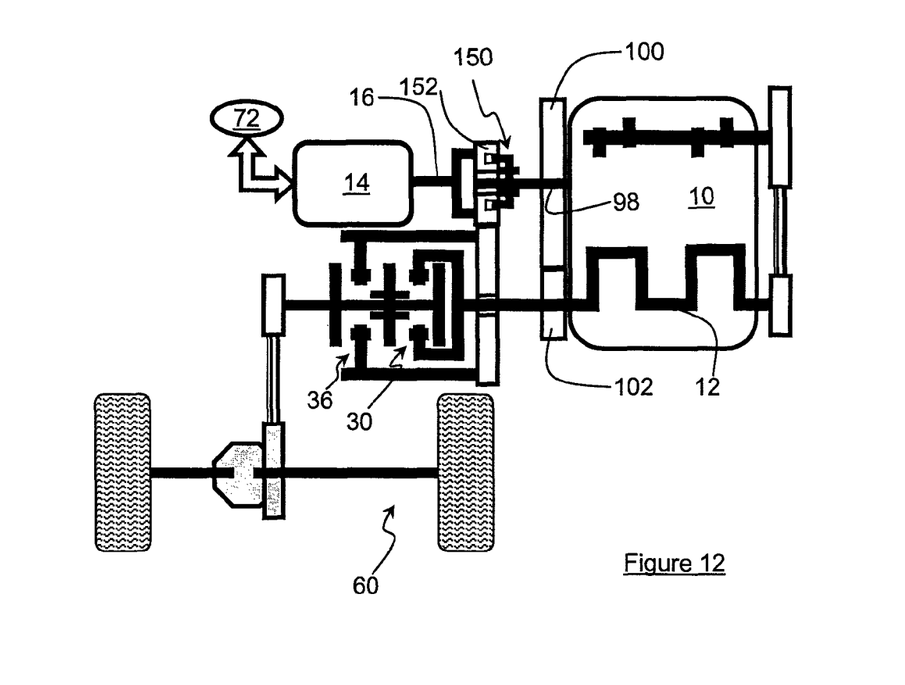

In the example illustrated in FIG. 12, electric machine 14 is used for starting engine 10.

Jaw coupling 150 is therefore engaged and neither couplings 30 and 36 are operational.

As soon as electric machine 14 is supplied by accumulators 72, its rotor 16 is driven in rotation. Due to the link with axle 98, wheel 100 is driven in rotation. This rotation is transmitted to driving wheel 102 that drives shaft 12 so as to allow engine 10 to start.

All the other configurations of the drive system are also possible with this variant according to the traction mode are used and/or to operate the thermal engine and of the electric machine, as already described in connection with FIGS. 1 to 5.

For the electric traction by machine 14 combined with thermal traction by engine 10, the configuration corresponds to that of FIG. 10.

Jaw coupling 150 is engaged and low-speed coupling 36 is operational.

The rotation of rotor 16 of the electric machine is transmitted to independent shaft 90 by plate 152, pulley 42 and coupling 36. Simultaneously, the rotation of shaft 12 is transmitted to pulley 42 by driving wheel 102, receiving wheel 100 and plate 152.

It is possible to make high-speed coupling 30 operational instead of coupling 36. In this case, the rotation of shaft 12 is directly transmitted to independent shaft 90.

Electric traction of the vehicle is then provided through transmission of the rotation of rotor 16 to independent shaft 90 through wheel 100 and wheel 102, jaw coupling 150 being engaged.

The thermal traction of the vehicle with recharging of the accumulators by machine 14 corresponds to the configuration of FIG. 10.

With the configuration of jaw coupling 150 being engaged and low-speed coupling 30 being is operational, the rotation of shaft 12 of engine 10 is transmitted both to electric machine 14 and to independent shaft 90.

The rotary transmission to machine 14 is achieved by driving wheel 102, receiving wheel 100 and jaw coupling 150 connected to rotor 16. The rotation of the rotor 16 allows this machine to be used as a current generator for recharging accumulators 72.

The rotation of plate 152 of the jaw coupling is transmitted to receiving pulley 42, then to independent shaft 90 through coupling 36.

In the option where high-speed coupling 30 is operational instead of low-speed coupling 36, transmission of the rotating motion of shaft 12 to rotor 16 is achieved as mentioned above with, in addition thereto, free rotation of pulley 42. This transmission of the rotating motion of shaft 12 is also achieved through the direct link with independent shaft 90 through coupling 30.

In the case of low speed with coupling 36 being operational, the rotation of rotor 16 of the electric machine is obtained through the rotation of shaft 12, wheels 100 and 102, and of plate 152. Simultaneously, the rotation of shaft 12 is transmitted to independent shaft 90 by driving wheel 102, receiving wheel 100, plate 152, pulley 42 and coupling 36.

Recharging of the accumulators by machine 14 corresponds to the configuration of FIG. 12 with jaw coupling 150 in engaged position, couplings 30 and 36 are not engaged. The rotating motion of shaft 12 is thus transmitted to rotor 16 by wheels 102, 100, and plate 152 connected to this rotor.

Brake energy recovery corresponds to the configuration of FIG. 9.

Jaw coupling 150 is not engaged and low-speed coupling 36 is engaged under the action of actuator 34.

Motive axle 60 drives in rotation independent shaft 90 via transmission device 92. This rotation is then transmitted to rotor 16 by coupling 36, pulley 42 and plate 152 connected to this rotor. This rotor rotation allows electric machine 14 to be used as a current generator for recharging the accumulators and/or for supplying vehicle accessories.

In cases where jaw coupling 150 is already engaged under the action of actuator 158, this also allows achieving engine braking, in addition to energy recovery. In fact, the rotation of plate 152 is transmitted to shaft 12 of the engine by wheels 100 and 102. Considering the connection between independent shaft 90 and plate 152, slowing down thereof through shaft 12 of the engine leads to slowing down of independent shaft 90 and, consequently, of motive axle 60.

It is also possible to achieve engine braking in addition to energy recovery by making high-speed coupling 30 operational. Axle 60 therefore drives shaft 12 through the agency of coupling 30, which itself drives rotor 16 through wheel 102, wheel 100 and plate 152 under the action of jaw coupling 150 that is engaged.

It is also possible to consider using only engine braking by making only friction coupling 30 operational. The rotation of independent shaft 90 is thus slowed down by shaft 12 through high-speed coupling 30.

Figure 13:
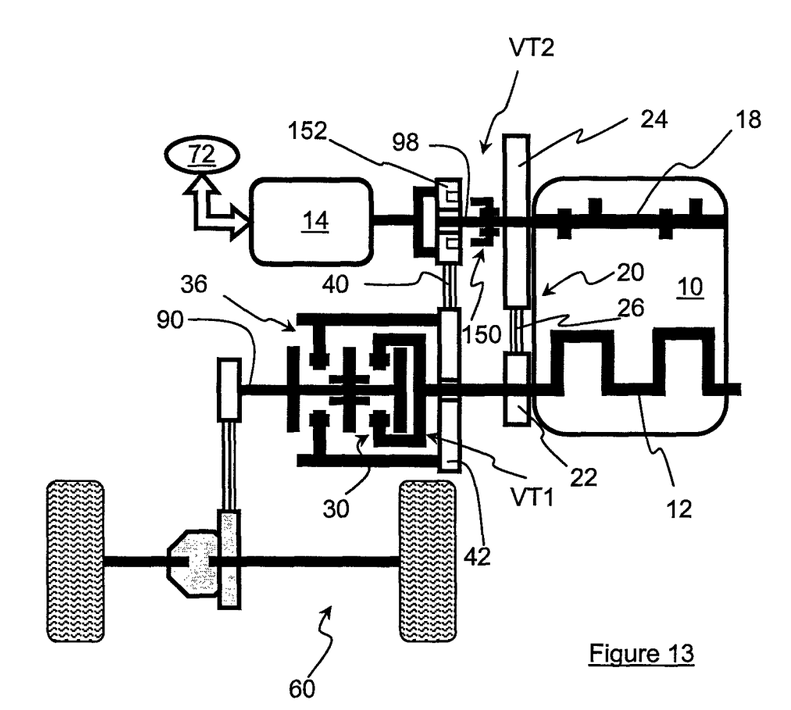
FIG. 13 is a variant of the drive system illustrated in FIG. 8.

The example illustrated in FIG. 13 is another configuration of the system shown in FIG. 8.

This example differs from the example of FIG. 8 in that wheels 22, 24 and belt 26 are placed in the situation of FIG. 1 by making up the speed-reducer rotation transmission system 20 of this FIG. 1. Driving wheel 22 is therefore carried by shaft 12, receiving wheel 24 is carried by camshafts 18 and belt 26 connects the two wheels in rotation.

Furthermore, rotary axle 98 of FIG. 8 is fixedly and coaxially connected to camshaft 18.

Advantageously, receiving pulley 42 is connected by a belt 40 to plate 152 of jaw coupling 150.

In this configuration, the long transmission path VT1, as described above, has shaft 12 connected by high-speed coupling 30 to independent drive shaft 90. The short transmission path VT2 has speed-reducer rotation transmission system 20 and of another speed-reducer rotation transmission system with plate 152 (jaw coupling 150 engaged), belt 40, receiving pulley 42 and low-speed coupling 36.

The operation of this other illustration of the drive system is substantially identical to that described in connection with FIGS. 8 to 12.

The present invention is not limited to the examples described and it encompasses any variant or equivalent without departing from the scope of the invention as defined above.

The invention claimed is:

1. A travel system of a hybrid motor vehicle comprising:
a thermal engine including a shaft, an electric machine including a rotor connected to at least one electric accumulator, a drive shaft controlled in rotation by at least one of the electric machine and the engine for rotating a motive axle of the vehicle, and a rotary speed variation device located between the drive shaft and a shaft of the engine, wherein the rotary speed variation device comprises at least two alternate transmission paths for rotary motion transmission to the motive axle with each path being controlled by at least one disengageable coupling; and wherein
one of the at least two alternate transmission paths comprises the shaft of the engine, an engine shaft rotating speed reduction device and one of the at least one disengageable coupling for connection in rotation between the rotary speed variation device and the shaft of the engine; and
the rotary speed variation device comprises a speed-reducer motion transmission device between the shaft of the engine and at least one of at least one camshaft and another rotary speed variation device disposed between the at least one camshaft and another of the at least one disengageable coupling.

2. A travel system of a motor vehicle as claimed in claim 1, wherein one of the at least two transmission paths comprises the shaft of the engine and one of the at least one disengageable coupling for connection in rotation with the drive shaft.

3. A travel system for a motor vehicle as claimed in claim 2 wherein the drive shaft carries a disengageable coupling for transmission of rotary motion thereof to the motive axle.

4. A travel system for a motor vehicle as claimed in claim 1, wherein the rotary speed reduction device comprises a speed-reducer motion transmission device between the shaft of the engine and a rotary axle carried by a fixed part of the vehicle and another speed reducer motion transmission device between the rotary axle and the another of the at least one disengageable coupling.

5. A travel system for a motor vehicle as claimed in claim 4 wherein the drive shaft carries a disengageable coupling for transmission of rotary motion thereof to the motive axle.

6. A travel system for a motor vehicle as claimed in claim 1, wherein the another rotary speed variation device comprises a disengageable coupling providing rotary motion transmission between the rotary axle and the another of the at least one disengageable coupling.

7. A travel system for a motor vehicle as claimed in claim 6 wherein the drive shaft carries a disengageable coupling for transmission of rotary motion thereof to the motive axle.

8. A travel system for a motor vehicle as claimed in claim 1, wherein the rotary speed reduction device comprises an epicyclic train with an inner planetary gear carried by the shaft, an outer planetary gear carried by a fixed part of the vehicle and satellite gears carried by the another of the at least one disengageable coupling.

9. A travel system for a motor vehicle as claimed in claim 8 wherein the drive shaft carries a disengageable coupling for transmission of rotary motion thereof to the motive axle.

10. A travel system for a motor vehicle as claimed in claim 1 wherein the drive shaft carries a disengageable coupling for transmission of rotary motion thereof to the motive axle.

11. A travel system for a motor vehicle as claimed in claim 1, wherein the drive shaft carries an actuator for operating one or another of the at least one disengageable coupling.

12. A travel system for a motor vehicle as claimed in claim 1, wherein the drive shaft comprises a shaft independent of at least one of the engine and of the electric machine.

13. A travel system for a motor vehicle as claimed in claim 1, wherein the drive shaft is connected to the motive axle by a motion transmission device.

14. A travel system for a motor vehicle comprising:
a thermal engine including a shaft, an electric machine including a rotor connected to at least one electric accumulator, a drive shaft controlled in rotation by at least one of the electric machine and the engine for rotating a motive axle of the vehicle, and a rotary speed variation device located between the drive shaft and a shaft of the engine, the rotary speed variation device comprising at least two alternate transmission paths for rotary motion transmission to the motive axle with each path being controlled by at least one disengageable coupling; and wherein
one of the at least two alternate transmission paths comprises the shaft of the engine, an engine shaft rotating speed reduction device and one of the at least one disengageable coupling for connection in rotation between the rotary speed variation device and the shaft of the engine; and
the rotary speed reduction device comprises a speed-reducer motion transmission device between the shaft of the engine and at least one of at least one camshaft and another rotary speed variation device disposed between the at least one camshaft and another of the at least one disengageable coupling; and wherein
the drive shaft comprises the rotor of the electric machine.

15. A method of travel by a hybrid motor vehicle including a thermal engine with a shaft, an electric machine with a rotor connected to at least one electric accumulator, a drive shaft, controlled in rotation by the electric machine and the engine, for a rotating a motive axle of the vehicle, and a speed variation device located between the drive shaft and the shaft of engine connecting the shaft of the engine to the drive shaft, the method comprising:
operating the rotating motive axle of the vehicle with at least two alternate paths to provide rotary motion transmission with each path being controlled by at least one disengageable coupling; and
starting the thermal engine, by supplying the electric machine from the at least one electric accumulator and connecting the rotor of the electric machine to the drive shaft of the engine through one of the at least two alternative paths to provide motion transmission.

16. A method for traveling by a motor vehicle as claimed in claim 15, comprising providing one of the at least two alternative paths for rotary motion transmission with a device for reducing a rotary speed of the shaft to provide rotation of the drive shaft with a rotating speed different from a rotating speed of another of the at least two alternative paths.

17. A method for traveling by a motor vehicle as claimed in claim 16, comprising recharging the at least one electric accumulator by connecting the drive shaft of engine to the rotor of the electric machine by one of the at least two alternative motion transmission paths.

18. A method for traveling by a motor vehicle as claimed in claim 15, comprising recharging the at least one electric accumulator by connecting the drive shaft of engine to the rotor of the electric machine by one of the at least two alternative motion transmission paths.

19. A method of travel by a hybrid motor vehicle including a thermal engine with a shaft, an electric machine with a rotor connected to at least one electric accumulator, a drive shaft, controlled in rotation by the electric machine and the engine, for a rotating a motive axle of the vehicle, and a speed variation device located between the drive shaft and the shaft of engine connecting the shaft of the engine to the drive shaft, the method comprising:
operating the rotating motive axle of the vehicle with at least two alternate paths to provide rotary motion transmission with each path being controlled by at least one disengageable coupling; and
recharging the at least one electric accumulator by connecting the drive shaft of engine to the rotor of the electric machine by one of the at least two alternative motion transmission paths.

20. A method for travelling by a motor vehicle as claimed in claim 19, comprising braking the vehicle by recovering mechanical energy of the rotating motive axle to transmit the energy to the engine shaft by connecting the drive shaft to the shaft by one of the at least two alternative motion transmission paths.

* * * * *